United States Patent [19]

Jorgensen et al.

[11] Patent Number: 4,954,667
[45] Date of Patent: Sep. 4, 1990

[54] ELECTRICAL BOX WITH COUPLING MEMBERS

[75] Inventors: Robert W. Jorgensen, Niles, Mich.; Kenneth R. Schnell, South Bend, Ind.

[73] Assignee: Hubbell Incorporated, Orange, Conn.

[21] Appl. No.: 311,334

[22] Filed: Feb. 15, 1989

[51] Int. Cl.⁵ .............................................. H02G 3/08
[52] U.S. Cl. .................................................... 174/53
[58] Field of Search ........................... 174/53; 220/3.2

[56] References Cited

U.S. PATENT DOCUMENTS 3,955,463  5/1976  Hoehn ..................................... 85/36
4,315,100  2/1982  Haslbeck et al. ...................... 174/51
4,424,405  1/1984  Nattel ..................................... 174/53

Primary Examiner—Leo P. Picard
Assistant Examiner—David A. Tone
Attorney, Agent, or Firm—Jerry M. Presson; Alfred N. Goodman

[57] ABSTRACT

An electrical wall or ceiling box adapted to rapidly and securely couple an electrical wiring device thereto. The electrical box includes a pair of wedge-shaped inserts positioned within a pair of openings in the end walls of the electrical box. The inserts have a threaded, curved face portion for gripping a mounting screw and an oppositely facing sloping face portion for interacting with the sloping wall portions of the openings in the electrical box. The inserts also have a shoulder extending outwardly on three sides for engaging a three-sided ledge within the openings for retaining the inserts therein. This structure results in a significantly higher retention force than in prior devices, tending to resist disengagement of the inserts with the box upon insertion of a mounting screw therein.

8 Claims, 3 Drawing Sheets

FIG. 4.
FIG. 5.
FIG. 6.
FIG. 7.
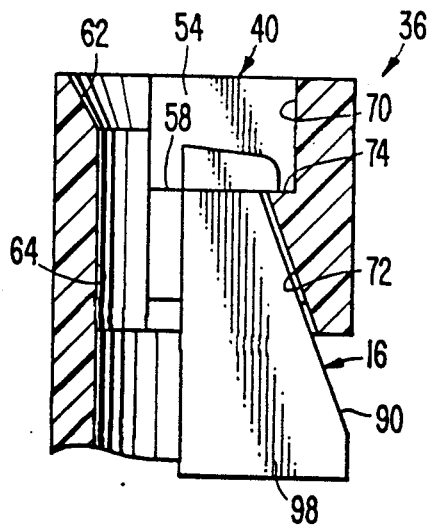
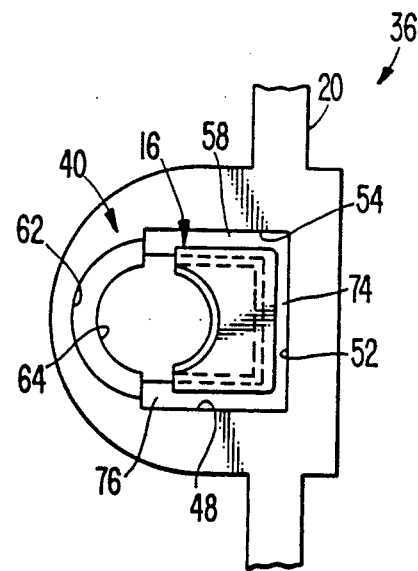
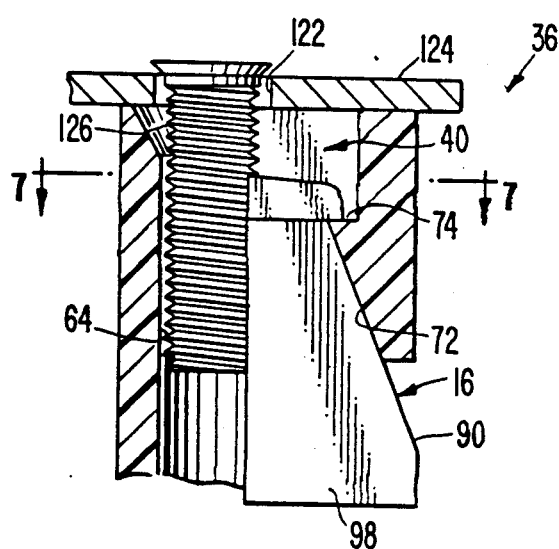

ELECTRICAL BOX WITH COUPLING MEMBERS

Field of the Invention

This invention relates to an electrical wiring box, such as wall boxes and ceiling boxes, formed of a nonmetallic material and means for securely coupling an electrical wiring device thereto. More specifically, the invention relates to a pair of wedge-shaped inserts positioned in a pair of openings in the end walls of the electrical box for gripping the mounting screws of an electrical wiring device.

Background of the Invention

A relatively recent trend in electrical wiring boxes for switches, outlets and light fixtures is making them from plastic. Such boxes are typically made from thermoplastic or thermoset resins with flame retarding agents incorporated therein. Plastic electrical wiring boxes have various advantages, but they present the problem of not providing a quick way of mounting wiring devices thereon.

Typically, the wiring device is coupled to the box by providing lugs at each end of the box having threaded openings to align with openings in the wiring device. To install the wiring device, the openings in the device and in the lugs are aligned and screws are threaded into the threads in the lugs to locate the wiring device in position in the box. The formation of threaded lugs in plastic boxes is not always desirable. For example, if an excessive amount of torque is applied to the device screws during mounting, it is possible to strip the threads provided in the wall of the plastic wiring box. Even in the absence of such excessive torque during the installation of a device in such boxes, the threads in the soft plastic box typically will not always endure the removal and replacement of a wiring device in the box at some later time.

Various other mounting arrangements for plastic electrical boxes are known in the prior art. However, these mounting arrangements also have several disadvantages.

For example, U.S. Pat. No. 4,315,100 to Haslbeck et al discloses an electrical box having a wedge-shaped insert slidably positioned in openings in the end walls of the electrical box. The insert has two opposed shoulders engageable with two ledges on the box to keep the inserts in place after their insertion at the factory. A disadvantage of the Haslbeck et al box is that, upon insertion of the mounting screws, the inserts tend to pop out since the shear strength of the two shoulders is not great.

Another example is U.S. Pat. No. 3,955,463 to Hoehn which describes a screw mounting clip that can be used to fasten a wiring device in an electrical box. The arrangement in the Hoehn patent utilizes a flat clip having a yieldable pawl arm received in a slot. The Hoehn clip is disadvantageous since the molding of the box is quite difficult due to a number of narrow slots required for properly locating these clips. Furthermore, it has been found that the device screw is difficult to torque properly since it tends to slip.

Other disadvantages of metal clips include their requiring relatively high insertion forces to overcome the pawl of the clip and their relatively low retention forces. Ceiling boxes, for example, must withstand a 200 pound load, but metal clips cannot withstand this load due to their small contact areas.

A further example is U.S. Pat. No. 4,424,405 to Nattel which uses two wedge-shaped inserts that also tend to slip.

This invention addresses these problems in the art, along with other needs which will become apparent to those skilled in the art once given this disclosure.

Summary of the Invention

Accordingly, a primary object of the invention is to provide an electrical box in walls and ceilings for rapidly and securely mounting an electrical wiring device therein.

Another object of the invention is to provide a gripping insert that is relatively inexpensive to manufacture.

Another object of the invention is to provide a gripping insert that has significantly increased shear strength and will not pop out the back side upon insertion of the mounting screw into the opening.

The foregoing objects are basically attained by providing an electrical box assembly adapted to engage the mounting screws of an electrical wiring device to be mounted in the box assembly, the combination comprising: an electrical box including a pair of lugs located at the top of opposed ends of the box, an opening extending through each of the lugs, the opening having first and second opposed walls, one of the opposed walls having an upwardly and inwardly sloping portion, and having an upwardly facing first ledge; and a pair of coupling members, one being received in each of the openings and each including a body portion having a curved first face for coacting with the mounting screw of the wiring device and a downwardly and outwardly sloping second face facing in an opposite direction to the curved first face and slidably engaging the sloping portion, and a head portion having a first shoulder extending outwardly from the coupling member in the same direction as the sloping face for engaging the ledge.

Other objects, advantages and salient features of the invention will become apparent from the following detailed description, which, taken in conjunction with the annexed drawings, discloses a preferred embodiment of the invention.

Brief Description of the Drawings

Referring now to the drawings, which form part of this original disclosure:

FIG. 4 is an enlarged fragmentary cross-sectional elevational view of the mounting lug having a wedge-shaped insert positioned within its opening;

FIG. 5 is an enlarged partial top plan view of the mounting lug shown in FIG. 4 and in particular showing its opening having a wedge-shaped insert positioned therein;

FIG. 6 is an enlarged fragmentary cross-sectional elevational view of a mounting lug with a mounting screw inserted into, its opening and engaging the wedge-shaped insert;

FIG. 7 is an enlarged fragmentary cross-sectional top plan view taken along line 7—7 in FIG. 6;

Detailed Description of the Invention

Figure 1:
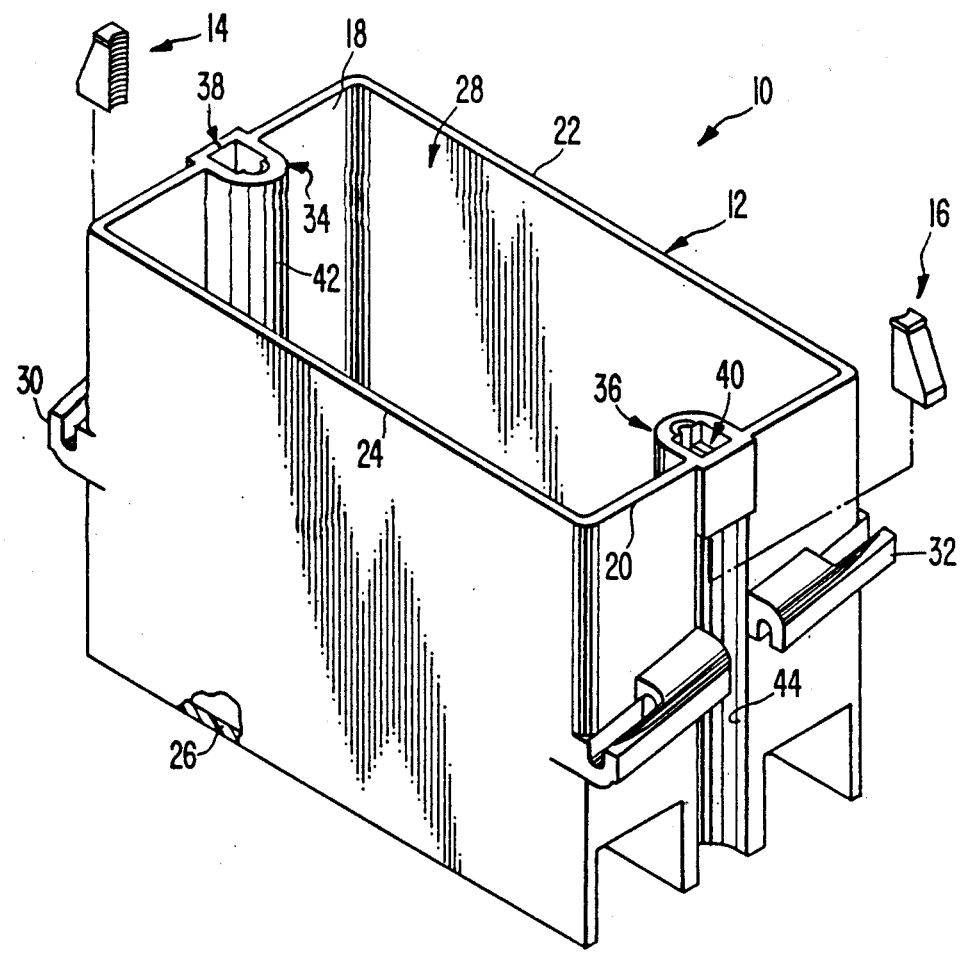
FIG. 1 is an exploded left-perspective view of an electrical wiring box in the form of a wall box and a pair of wedge-shaped inserts in accordance with the present invention.

As is seen in FIG. 1, the electrical wiring box assembly 10 includes an electrical wiring box 12 in the form of a wall box and a pair of wedge-shaped coupling members, or inserts, 14 and 16 in accordance with the present invention. While box 12 is shown as a wall box, it could also be a round or polygonal ceiling box.

The wiring box 12 comprises a pair of generally planar end walls 18 and 20 and a pair of generally planar side walls 22 and 24. Rear wall 26 connects the end walls 18 and 20 and the side walls 22 and 24 together to form a box chamber having a top opening 28 for mounting an electrical wiring device therein.

The wiring box 12 is formed as a one-piece, unitary, integrally molded member from a suitable non-metallic material, such as a thermoplastic or thermoset composition. An example of such a thermoplastic material is polyvinylchloride, and an example of such a thermoset material is a phenolic resin. The coupling members 14 and 16 are preferably molded from a suitable non-metallic material, such as nylon or acetal resin. The wiring box 12 may be provided with integrally molded features such as nail channels 30 and 32 and clamping members (not shown) such as those disclosed in U.S. Pat. No. 4,605,816 to Jorgensen et al.

The end walls 18 and 20 include substantially semi-cylindrical mounting lugs 34 and 36, respectively, each having a planar top or front face and a planar rear face with axially extending openings 38 and 40, respectively. The end walls 18 and 20 further include a pair of outwardly opening channels 42 and 44, respectively, running the entire length of the end wall beneath the respective mounting lugs 34 and 36 for permitting coupling members 14 and 16 to be inserted into openings 38 and 40.

Figure 2:
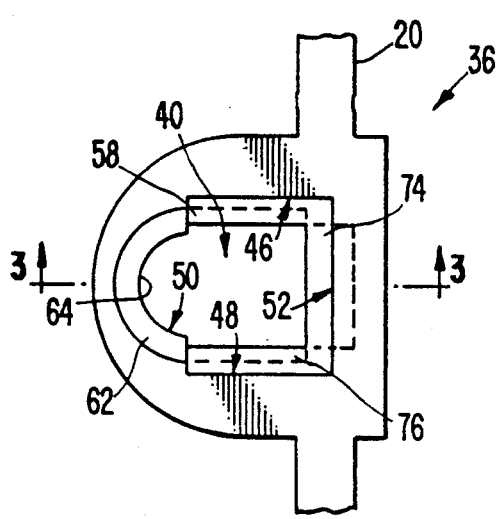
FIG. 2 is an enlarged partial top plan view of the box shown in FIG. 1 and in particular showing the opening in the mounting lug for receiving the mounting screw of an electrical wiring device.
Figure 3:
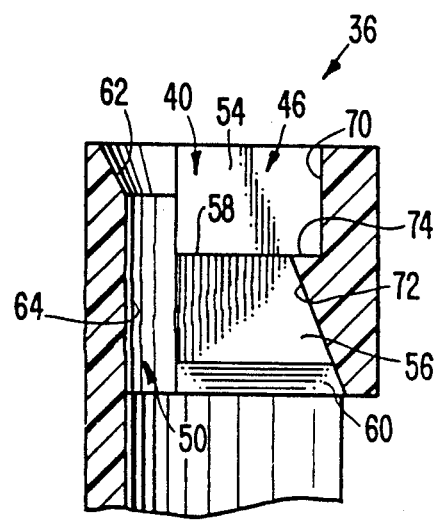
FIG. 3 is an enlarged fragmentary cross-sectional elevational view of the mounting lug taken along line 3—3 in FIG. 2.

The mounting lugs 34 and 36 are mirror images, so only mounting lug 36 will be discussed in detail. As seen in FIGS. 2 and 3, the opening 40 in the lug has two pairs of opposed walls including a first pair of opposed side walls 46 and 48 and a second pair of opposed end walls 50 and 52. The opposed side walls 46 and 48 are identical, and thus only opposed side wall 46 will be discussed in detail. Opposed side wall 46 includes a first planar wall portion 54, a second planar wall portion 56, an upwardly facing planar ledge 58 extending inwardly from the first planar wall portion 54 to the second planar wall portion 56, and a third planar wall portion 60 sloping inwardly and upwardly into wall portion 56.

The opposed end wall 50 of opening 40 includes a tapered, curved wall portion 62 and a vertical curved wall portion 64. The opposed end wall 52 includes a first planar wall portion 70, a second planar wall portion 72 sloping upwardly and inwardly, and an upwardly facing planar ledge 74 extending inwardly between the planar wall portion 70 and the sloping wall portion 72. Ledge 76 corresponds to ledge 58 but is on side wall 48.

Thus, opening 40 is defined by first wall 50, second wall 52, third wall 46 and fourth wall 48.

As seen in FIG. 2, a single continuous, substantially U-shaped, three-sided ledge is formed by first ledge 74, second ledge 58, and third ledge 76 for retaining the coupling member 16 within the opening 40, as will be discussed below, once the insert is inserted therein.

Figure 8:
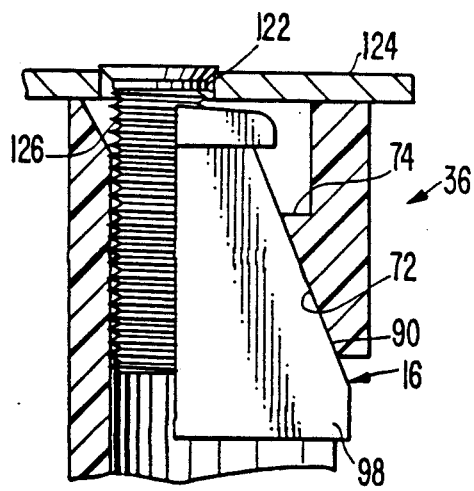
FIG. 8 is an enlarged fragmentary cross-sectional elevational view of the mounting lug having a mounting screw positioned within its opening which has been tightened and tightly engages a wall of the lug and the wedge-shaped insert.
Figure 9:
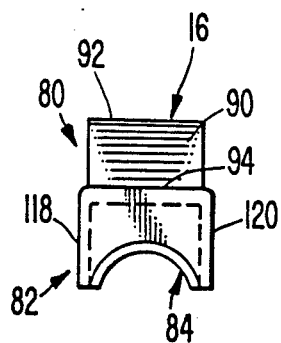
FIG. 9 is an enlarged top plan view of a wedge-shaped insert in accordance with the present invention.
Figure 10:
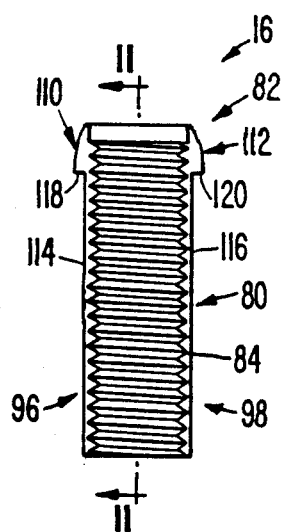
FIG. 10 is an enlarged elevational view of a wedge-shaped insert in accordance with the present invention.
Figure 11:
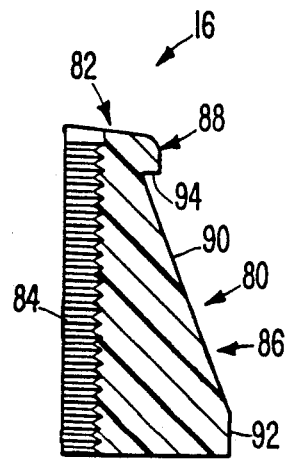
FIG. 11 is an enlarged cross-sectional elevational view of the wedge-shaped insert taken along section line 11—11 in FIG. 10.

As seen in FIGS. 9, 10 and 11, the coupling member 16 is a one-piece, wedge-shaped insert having a body portion 80 and a head portion 82. The coupling member 16 has a concave curved first face portion 84 extending the full length of the body and head portions 80 and 82, respectively. The curved face portion 84 has threads integrally formed therein for receiving and gripping the threads of a mounting screw 126, as seen in FIGS. 6-8. The curved portion threads accept 6-32 screws in wall boxes and 8-32 screws in ceiling boxes. Opposite second face portion 86 faces in a direction opposite to the curved face portion 84 and includes a first shoulder 88 extending outwardly from the head portion 82, a downwardly and outwardly sloping planar surface 90, and a short, vertically extending planar surface 92. A downwardly facing ledge 94 is formed between shoulder 88 and sloping surface 90 for engaging ledge 74 of the opening 40. The ledge 94 extends about 0.025 inch outwardly from the sloping surface 90, and as seen in FIGS. 4-7, overlies ledge 74.

The coupling member 16 further includes third and fourth planar side face portions 96 and 98 extending between the curved face portion 84 and the opposite face portion 86. The side face portions 96 and 98 include second and third shoulders 110 and 112, respectively, extending outwardly from the head portion 82 and a pair of parallel planar side portions 114 and 116. A pair of downwardly facing ledges 118 and 120 are formed at the junction of the shoulders 110 and 112 and the side faces 114 and 116. The ledges 118 and 120 extend about 0.0158 inch outwardly from the side portions 114 and 116 and, as seen in FIGS. 4-7, overlie ledges 58 and 76.

The ledges 94, 118 and 120 form a continuous, substantially U-shaped, three-sided ledge or shoulder which is larger than and engages the continuous ledge formed by the ledges 74, 58 and 76 in the opening 40 for retaining the coupling member 16 within opening 40 and preventing it from being pushed out the back. These engaging ledges provide significant retention force to the coupling member when a mounting screw is inserted into the opening and tends to drive the coupling member out of the opening. In comparing this structure to the two-ledged and two-shouldered structure in the Haslbeck U.S. Pat. No. 4,315,100, it has been found that the retention force, i.e., shear strength, of coupling members 14 and 16 is increased a significant amount, at least by 100%.

To install a wiring device within the electrical box 12, coupling members 14 and 16 are first inserted into the openings 38 and 40, respectively, by force-fitting them upwardly therein to a position as shown in FIG. 4. In this position, downwardly facing ledges 94, 118 and 120 engage upwardly facing ledges 74, 58 and 76, respectively, which maintains the coupling member in the opening. Typically, the coupling members 14 and 16 are positioned in openings 38 and 40 at the factory so that the box is ready for use. To connect the wiring device to the electrical wiring box 12, the wiring device is moved adjacent to the box so that apertures 122 of the wiring device's mounting ears 124, seen in FIG. 6, are substantially aligned with the openings 38 and 40 in the mounting lugs 34 and 36. The mounting screws 126 are then pushed into the openings 38 and 40 and along the coupling members 14 and 16 as shown in FIGS. 6 and 7. By increasing the shear strength of the coupling member's head portion by using the three-sided shoulder, the coupling member resists the force exerted by insertion of the mounting screw tending to drive the coupling member downwardly and out of the opening. The screws 126 are then tightened, typically by about two turns, causing the coupling members 14 and 16, which they engage, to be drawn upwardly to secure the wiring device to the electrical box 12, as seen in FIG. 8. This upward movement is aided by the sloping wall portion 72 which bears against the sloping face 90 of the coupling members 14 and 16, which in turn causes the curved face portion 84 of the coupling members 14 and 16 to bear tightly against the threads of the mounting screws 126.

At the same time, screw 126 is also forced against wall 64 of opening 40. The crests of the thread on screw 126 are, in fact, imbedded in wall 64. The more tightly the screw is torqued, the deeper the threads will be embedded. The grip is so tight, that carried to extreme torque, the head of the screw will twist off before the threads will strip out. This makes the present invention particularly safe for ceiling boxes.

While only one embodiment has been chosen to illustrate the invention, it will be understood by those skilled in the art that various changes and modifications can be made herein without departing from the scope of the invention as defined in the appended claims.

What is claimed is:

1. An electrical box assembly adapted to engage the mounting screws of an electrical wiring device to be mounted in the box assembly, the combination comprising:
    an electrical box including
    a pair of lugs located at the top of opposed ends of said box,
    each of said openings having first and second opposed walls, one of said opposed walls having an upwardly and inwardly sloping portion with an upwardly facing first ledge, a third wall having an upwardly facing second ledge and a fourth wall having an upwardly facing third ledge; and
    a pair of coupling members, one being received in each of said openings and each including
    a body portion having a curved first face for coacting with the mounting screw of the wiring device, a downwardly and outwardly sloping second face facing in an opposite direction to said curved first face and slidably engaging said sloping portion, and third and fourth faces, each extending between said first and second faces, and
    a head portion having a first shoulder extending outwardly from said coupling member in the same direction as said sloping face for engaging said first ledge, and second and third shoulders extending outwardly from said third and fourth faces for engaging, respectively, said second and third ledges,
    said first, second and third shoulders forming a continuous shoulder.

2. The electrical box assembly according to claim 1, wherein
    said first shoulder extends outwardly a greater distance from said sloping face than said second and third shoulders extend from said third and fourth faces.

3. The electrical box assembly according to claim 1, wherein
    said curved first face has a threaded portion for engaging the mounting screw's threads.

4. The electrical box assembly according to claim 1, wherein
    one of said walls is curved.

5. The electrical box assembly according to claim 1, wherein
    said continuous shoulder is substantially U-shaped, and
    said first, second and third ledges form a substantially continuous U-shaped ledge.

6. A coupling member adapted to be positioned in an opening formed in an electrical box, the combination comprising:
    a body portion having a curved face portion and a downwardly and outwardly sloping face portion opposed to said curved face portion; and
    a head portion coupled to said body portion and having a first shoulder extending outwardly therefrom in the same direction as said sloping face portion, and second and third shoulders extending outwardly from said head portion on opposite sides of said first shoulder, said first, second and third shoulders forming a continuous shoulder,
    whereby, upon insertion of said coupling member into the opening, said shoulders will engage corresponding ledges formed in the opening for mounting and retaining said coupling member within the opening.

7. The coupling member according to claim 6, wherein
    said first shoulder extends outwardly a greater distance than said second and third shoulders.

8. The coupling member according to claim 6, wherein
    said continuous shoulder is substantially U-shaped.

* * * * *